US010829505B2

(12) United States Patent
Moore et al.

(10) Patent No.: US 10,829,505 B2
(45) Date of Patent: Nov. 10, 2020

(54) LITHIUM ALKYLSILICONATE COMPOSITION, COATING, AND METHOD OF MAKING SAME

(71) Applicant: Dow Silicones Corporation, Midland, MI (US)

(72) Inventors: James A Moore, Midland, MI (US); Binh Thanh Nguyen, Midland, MI (US); David Brian Selley, Bay City, MI (US); Arthur James Tselepis, Midland, MI (US); Ming-Shin Tzou, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 276 days.

(21) Appl. No.: 16/089,663

(22) PCT Filed: Feb. 6, 2017

(86) PCT No.: PCT/US2017/016628
§ 371 (c)(1),
(2) Date: Sep. 28, 2018

(87) PCT Pub. No.: WO2017/184231
PCT Pub. Date: Oct. 26, 2017

(65) Prior Publication Data
US 2019/0106442 A1   Apr. 11, 2019

Related U.S. Application Data

(60) Provisional application No. 62/324,948, filed on Apr. 20, 2016.

(51) Int. Cl.
C07F 7/00        (2006.01)
C07F 7/18        (2006.01)
C04B 41/00       (2006.01)
C04B 41/49       (2006.01)
C04B 41/64       (2006.01)
C09D 183/08      (2006.01)
C08G 77/398      (2006.01)
C04B 28/02       (2006.01)

(52) U.S. Cl.
CPC ............ *C07F 7/1872* (2013.01); *C04B 28/02* (2013.01); *C04B 41/009* (2013.01); *C04B 41/4927* (2013.01); *C04B 41/64* (2013.01); *C08G 77/398* (2013.01); *C09D 183/08* (2013.01)

(58) Field of Classification Search
None
See application file for complete search history.

(56) References Cited

U.S. PATENT DOCUMENTS

| 2,210,320 A | 10/1879 | Carpenter et al. |
| 2,438,055 A | 3/1948 | Hyde et al. |
| 3,208,972 A | 9/1965 | Lyons |
| 3,574,651 A | 4/1971 | Nitzsche et al. |
| 4,137,352 A | 1/1979 | Stonebridge |
| 4,429,302 A | 1/1984 | Vandebult |
| 4,433,013 A | 2/1984 | Puhringer |
| 4,517,375 A | 5/1985 | Schmidt |
| 4,624,900 A | 11/1986 | Fau |
| 4,648,904 A | 3/1987 | DePasquale et al. |
| 4,716,051 A | 12/1987 | Rodder |
| 4,877,654 A | 10/1989 | Wilson |
| 4,990,377 A | 2/1991 | Wilson |
| 5,037,873 A | 8/1991 | Heaton |
| 5,051,129 A | 9/1991 | Cuthbert et al. |
| 5,178,668 A | 1/1993 | Traver et al. |
| 5,205,860 A | 4/1993 | Narula et al. |
| 5,209,775 A | 5/1993 | Bank et al. |
| 5,290,900 A | 3/1994 | Kobayashi |
| 5,300,327 A | 4/1994 | Stark-Kasley et al. |
| 5,302,335 A | 4/1994 | Naganawa et al. |
| 5,354,832 A | 10/1994 | Chang et al. |
| 5,356,463 A | 10/1994 | Kober et al. |
| 5,356,716 A | 10/1994 | Patel |
| 5,359,109 A | 10/1994 | Ritscher et al. |
| 5,393,330 A | 2/1995 | Chen et al. |
| 5,399,191 A | 3/1995 | Mayer et al. |
| 5,436,307 A | 7/1995 | Katsushima |
| 5,442,011 A | 8/1995 | Halling |
| 5,446,270 A | 8/1995 | Chamberlain et al. |
| 5,449,712 A | 9/1995 | Gierke et al. |
| 5,458,923 A | 10/1995 | Goebel et al. |
| 5,527,619 A | 6/1996 | Rokowski et al. |
| 5,527,931 A | 6/1996 | Rich et al. |
| 5,527,935 A | 6/1996 | Stepp et al. |

(Continued)

FOREIGN PATENT DOCUMENTS

| AT | 400054 | 9/1995 |
| AU | 199714938 | 9/1997 |
| CN | 1099364 | 3/1995 |
| CN | 1102169 | 5/1995 |
| CN | 1223284 | 7/1999 |
| CN | 1248601 | 3/2000 |
| CN | 1250072 | 4/2000 |
| DE | 1176137 | 8/1964 |
| DE | 4138745 | 2/1993 |
| DE | 4128424 | 3/1993 |
| DE | 4341260 | 5/1994 |
| DE | 4437879 | 5/1995 |

(Continued)

*Primary Examiner* — Stefanie J Cohen
(74) *Attorney, Agent, or Firm* — Catherine U. Brown

(57) ABSTRACT

A method of making a lithium alkylsiliconate composition comprising adding an alkylalkoxysilane to a first mixture comprising lithium hydroxide and water to form a second mixture comprising a lithium alkylsiliconate and an alcohol, wherein i) the mole ratio of lithium hydroxide to alkylalkoxysilane is from 0.9 to less than 1.1 and the water is from 89 to 93 mol %, or ii) the mole ratio of lithium hydroxide to alkylalkoxysilane is from 1.1 to 1.4 and the water is from greater than 93 to 99 mole %.

11 Claims, No Drawings

(56) References Cited

U.S. PATENT DOCUMENTS

| | | |
|---|---|---|
| 5,531,812 A | 7/1996 | Montigny et al. |
| 5,539,051 A | 7/1996 | Satou et al. |
| 5,543,445 A | 8/1996 | Nield et al. |
| 5,548,018 A | 8/1996 | Maekawa |
| 5,550,184 A | 8/1996 | Halling |
| 5,552,476 A | 9/1996 | Halling |
| 5,556,915 A | 9/1996 | Suzuki et al. |
| 5,593,493 A | 1/1997 | Krofchak |
| 5,618,627 A | 4/1997 | Merrifield et al. |
| 5,650,004 A | 7/1997 | Yon |
| 5,681,892 A | 10/1997 | Weidner et al. |
| 5,686,523 A | 11/1997 | Chen et al. |
| 5,695,551 A | 12/1997 | Buckingham et al. |
| 5,702,509 A | 12/1997 | Pellerite et al. |
| 5,712,340 A | 1/1998 | Gyotoku et al. |
| 5,714,532 A | 2/1998 | Osterholtz et al. |
| 5,726,235 A | 3/1998 | Takagi et al. |
| 5,746,810 A | 5/1998 | Suzuki |
| 5,766,323 A | 6/1998 | Butler et al. |
| 5,776,245 A | 7/1998 | Thomas |
| 5,776,392 A | 7/1998 | Schmuck |
| 5,798,429 A | 8/1998 | Hager et al. |
| 5,817,262 A | 10/1998 | Englert |
| 5,824,421 A | 10/1998 | Kobayashi et al. |
| 5,851,594 A | 12/1998 | Feder et al. |
| 5,863,509 A | 1/1999 | Standke et al. |
| 5,900,280 A | 5/1999 | MacMullen |
| 5,919,296 A | 7/1999 | Be et al. |
| 5,964,934 A | 10/1999 | Englert |
| 5,965,664 A | 10/1999 | Lindley et al. |
| 5,969,037 A | 10/1999 | Hatano et al. |
| 5,998,525 A | 12/1999 | Wang et al. |
| 6,027,557 A | 2/2000 | Hayner |
| 6,074,470 A | 6/2000 | Fisher et al. |
| 6,103,001 A | 8/2000 | Fisher et al. |
| 6,111,010 A | 8/2000 | Yu et al. |
| 6,139,622 A | 10/2000 | Gobel et al. |
| 6,153,040 A | 11/2000 | Rohlf et al. |
| 6,177,582 B1 | 1/2001 | Jenkner et al. |
| 6,252,100 B1 | 6/2001 | Herzig |
| 6,262,171 B1 | 7/2001 | Mayer et al. |
| 6,268,423 B1 | 7/2001 | Mayer et al. |
| 6,284,834 B1 | 9/2001 | Kirchmeyer et al. |
| 6,319,980 B1 | 11/2001 | Ishikawa et al. |
| 6,323,268 B1 | 11/2001 | Fisher et al. |
| 6,329,461 B1 | 12/2001 | Akiyama et al. |
| 6,410,626 B1 | 6/2002 | Wada et al. |
| 6,528,580 B1 | 3/2003 | Feder et al. |
| 6,531,229 B1 | 3/2003 | Franzoni et al. |
| 6,590,026 B1 | 7/2003 | Dorget et al. |
| 6,706,853 B1 | 3/2004 | Stanssens et al. |
| 6,800,679 B2 | 10/2004 | Wada et al. |
| 6,866,709 B1 | 3/2005 | Holbek |
| 6,919,398 B1 | 7/2005 | Born et al. |
| 8,961,672 B2 * | 2/2015 | Stepp ............... C04B 41/64 106/2 |
| 9,878,980 B2 | 1/2018 | Babich et al. |
| 2009/0054580 A1 | 2/2009 | Joachim et al. |
| 2009/0111910 A1 * | 4/2009 | Gimvang ............ C09D 5/008 523/122 |
| 2014/0228589 A1 | 8/2014 | Stepp et al. |

FOREIGN PATENT DOCUMENTS

| | | |
|---|---|---|
| DE | 4424685 | 1/1996 |
| DE | 19537935 | 4/1996 |
| DE | 29611347 | 10/1996 |
| DE | 19529946 | 2/1997 |
| DE | 19626162 | 1/1998 |
| DE | 19707219 | 8/1998 |
| DE | 19818808 | 12/1998 |
| DE | 29915567 | 2/2000 |
| DE | 29921151 | 3/2000 |
| DE | 29917870 | 4/2000 |
| EP | 561668 | 9/1993 |
| EP | 607073 | 7/1994 |
| EP | 680991 | 11/1995 |
| EP | 690109 | 1/1996 |
| EP | 736504 | 10/1996 |
| EP | 810187 | 12/1997 |
| EP | 832864 | 4/1998 |
| EP | 913425 | 5/1999 |
| EP | 922683 | 6/1999 |
| FR | 2684682 | 6/1993 |
| FR | 2744727 | 8/1997 |
| FR | 2776654 | 10/1999 |
| FR | 2776655 | 10/1999 |
| JP | 1993009438 | 2/1993 |
| JP | 1993017268 | 3/1993 |
| JP | 1993025421 | 4/1993 |
| JP | 1993025432 | 4/1993 |
| JP | 1993097542 | 4/1993 |
| JP | 1993032442 | 5/1993 |
| JP | 1993116116 | 5/1993 |
| JP | 1993124880 | 5/1993 |
| JP | 1993042637 | 6/1993 |
| JP | 1993154808 | 6/1993 |
| JP | 1993287234 | 11/1993 |
| JP | 1993287235 | 11/1993 |
| JP | 1993319882 | 12/1993 |
| JP | 1993319951 | 12/1993 |
| JP | 1994033565 | 2/1994 |
| JP | 1994041492 | 2/1994 |
| JP | 1994093254 | 4/1994 |
| JP | 1994107482 | 4/1994 |
| JP | 1994128448 | 5/1994 |
| JP | 1994158032 | 6/1994 |
| JP | 1994199558 | 7/1994 |
| JP | 1994228535 | 8/1994 |
| JP | 1994248258 | 9/1994 |
| JP | 1994248259 | 9/1994 |
| JP | 1994279150 | 10/1994 |
| JP | 1994292858 | 10/1994 |
| JP | 1994298519 | 10/1994 |
| JP | 1994313012 | 11/1994 |
| JP | 1994313167 | 11/1994 |
| JP | 1994316692 | 11/1994 |
| JP | 1995018140 | 1/1995 |
| JP | 1995041757 | 2/1995 |
| JP | 1995109187 | 4/1995 |
| JP | 1995133396 | 5/1995 |
| JP | 1995133463 | 5/1995 |
| JP | 1995157709 | 6/1995 |
| JP | 1995165869 | 6/1995 |
| JP | 1995258549 | 10/1995 |
| JP | 1995277856 | 10/1995 |
| JP | 1996003243 | 1/1996 |
| JP | 1996003244 | 1/1996 |
| JP | 1996003245 | 1/1996 |
| JP | 1996027166 | 1/1996 |
| JP | 1996027424 | 1/1996 |
| JP | 1996059939 | 3/1996 |
| JP | 1996151757 | 6/1996 |
| JP | 1996157775 | 6/1996 |
| JP | 1996188694 | 7/1996 |
| JP | 1996199066 | 8/1996 |
| JP | 1996294904 | 11/1996 |
| JP | 1996333543 | 12/1996 |
| JP | 1997012906 | 1/1997 |
| JP | 1997020540 | 1/1997 |
| JP | 1997157636 | 6/1997 |
| JP | 1997173969 | 7/1997 |
| JP | 1997176488 | 7/1997 |
| JP | 1997189030 | 7/1997 |
| JP | 1997194245 | 7/1997 |
| JP | 1997208642 | 8/1997 |
| JP | 1997208643 | 8/1997 |
| JP | 1997235460 | 9/1997 |
| JP | 1997278562 | 10/1997 |
| JP | 1997286676 | 11/1997 |
| JP | 1997292875 | 11/1997 |
| JP | 1997298937 | 11/1997 |
| JP | 1997328375 | 12/1997 |

(56) References Cited

FOREIGN PATENT DOCUMENTS

| | | |
|---|---|---|
| JP | 1997328616 | 12/1997 |
| JP | 1997328868 | 12/1997 |
| JP | 1998001610 | 1/1998 |
| JP | 1998060421 | 3/1998 |
| JP | 1998169145 | 6/1998 |
| JP | 1998236889 | 9/1998 |
| JP | 1998287842 | 10/1998 |
| JP | 1999005922 | 1/1999 |
| JP | 1999005951 | 1/1999 |
| JP | 1999012311 | 1/1999 |
| JP | 1999076797 | 3/1999 |
| JP | 1999092251 | 4/1999 |
| JP | 1999106681 | 4/1999 |
| JP | 1999124533 | 5/1999 |
| JP | 1999130980 | 5/1999 |
| JP | 1999181355 | 7/1999 |
| JP | 1999189764 | 7/1999 |
| JP | 1999209160 | 8/1999 |
| JP | 1999236283 | 8/1999 |
| JP | 1999302566 | 11/1999 |
| JP | 1999349644 | 12/1999 |
| JP | 2000026691 | 1/2000 |
| JP | 2000033339 | 2/2000 |
| JP | 2000034308 | 2/2000 |
| JP | 2000034440 | 2/2000 |
| JP | 2000072983 | 3/2000 |
| JP | 2000110272 | 4/2000 |
| JP | 2000136323 | 5/2000 |
| JP | 2000169750 | 6/2000 |
| JP | 2001029174 | 2/2001 |
| JP | 2001029175 | 2/2001 |
| JP | 6065538 | 1/2017 |
| KR | 199402567 | 3/1994 |
| RO | 107266 | 10/1993 |
| RU | 2002609 | 11/1993 |
| RU | 2002721 | 11/1993 |
| RU | 2033500 | 4/1995 |
| RU | 2036209 | 5/1995 |
| RU | 2075400 | 3/1997 |
| RU | 2079465 | 5/1997 |
| RU | 2093630 | 10/1997 |
| RU | 2095239 | 11/1997 |
| RU | 2142975 | 12/1999 |
| WO | 1983001331 | 4/1983 |
| WO | 1993022895 | 11/1993 |
| WO | 1995016752 | 6/1995 |
| WO | 1995022580 | 8/1995 |
| WO | 1996039249 | 12/1996 |
| WO | 1997047569 | 12/1997 |
| WO | 1999028264 | 6/1999 |
| WO | 1999028275 | 6/1999 |
| WO | 1999055505 | 11/1999 |
| WO | 1999065844 | 12/1999 |
| WO | 2000026158 | 5/2000 |
| WO | 2000034207 | 6/2000 |

* cited by examiner

LITHIUM ALKYLSILICONATE COMPOSITION, COATING, AND METHOD OF MAKING SAME

CROSS-REFERENCE TO RELATED APPLICATIONS

This application is a U.S. national stage filing under 35 U.S.C. § 371 of PCT Application No. PCT/US2017/016628 filed on 6 Feb. 2017, which claims the benefit of U.S. Provisional Patent Application No. 62/324,948 filed 20 Apr. 2016 under 35 U.S.C. § 119 (e). PCT Application No. PCT/US2017/016628 and U.S. Provisional Patent Application No. 62/324,948 are hereby incorporated by reference.

FIELD OF THE INVENTION

The present invention relates to a method of making a lithium alkylsiliconate composition comprising adding an alkylalkoxysilane to a mixture comprising lithium hydroxide and water. The invention also relates to the lithium alkylsiliconate composition made by the method; a method of making a coating comprising applying the lithium alkylsiliconate composition to a substrate; and the coating.

BACKGROUND OF THE INVENTION

Methods of making alkali metal alkylsiliconate compositions are known. For example, alkali metal alkylsiliconates have been made by the reaction of alkylsilanols, alkylalkoxysilanols, or organodisiloxanes with metal oxides and hydroxides in the presence of water. The alkali metal alkylsiliconate compositions made by current methods find use in coating compositions for application to various silica-containing materials, such as cement or concrete, to provide water repellency and resistance to degradation caused by weather, chemicals and other corrosive elements. Even though coatings formed with the current alkali metal alkylsiliconates provide water repellency benefits to silica-containing materials, the water repellency of these coatings can still be improved. Therefore, there is still a need for new methods of making alkali metal alkylsiliconate compositions for use in coating compositions that form coatings with improved water repellency.

BRIEF SUMMARY OF THE INVENTION

The present invention is directed to a method of making a lithium alkylsiliconate composition comprising adding an alkylalkoxysilane to a first mixture comprising lithium hydroxide and water to form a second mixture comprising a lithium alkylsiliconate and an alcohol, wherein i) the mole ratio of lithium hydroxide to alkylalkoxysilane is from 0.9 to less than 1.1 and the water is from 89 to 93 mol %, or ii) the mole ratio of lithium hydroxide to alkylalkoxysilane is from 1.1 to 1.4 and the water is from greater than 93 to 99 mole %.

The present invention is further directed to a method of making a coating comprising applying the lithium alkylsiliconate composition to a substrate.

The method of the instant invention produces a lithium alkylsiliconate composition that forms coatings providing superior water repellency properties to silica-containing materials, such as cement, stone, masonry and concrete, as evidenced by low 8-hour water absorption test results as described below. The lithium alkylsiliconate composition may be used in coating compositions for application to silica-containing materials.

DETAILED DESCRIPTION OF THE INVENTION

A method of making a lithium alkylsiliconate composition, the method comprising:

adding an alkylalkoxysilane to a first mixture comprising lithium hydroxide and water to form a second mixture comprising a lithium alkylsiliconate and an alcohol, wherein i) the mole ratio of lithium hydroxide to alkylalkoxysilane is from 0.9 to less than 1.1 and the water is from 89 to 93 mol %, or ii) the mole ratio of lithium hydroxide to alkylalkoxysilane is from 1.1 to 1.4 and the water is from greater than 93 to 99 mole %.

The alkylalkoxysilane has the formula $R_aSi(OR)_{4-a}$ (I), wherein each R is independently $C_1$-$C_{10}$ alkyl or cycloalkyl; and the subscript a is 1, 2, or 3.

The alkyl groups represented by R typically have from 1 to 10 carbon atoms, alternatively from 1 to 6 carbon atoms, alternatively from 1 to 4 carbon atoms, alternatively 1 carbon atom. Acyclic alkyl groups containing at least three carbon atoms can have a branched or unbranched structure. Examples of alkyl groups include, but are not limited to, methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl. Examples of cycloalkyl groups include, but are not limited to, cyclopentyl, methylcyclopentyl, cyclohexyl, and methylcyclohexyl.

Examples of alkylalkoxysilanes include, but are not limited to, those having the formulae: $CH_3Si(OCH_3)_3$, $CH_3CH_2Si(OCH_3)_3$, $CH_3Si(OCH_2CH_3)_3$, $CH_3CH_2Si(OCH_2CH_3)_3$, $(CH_3)_2Si(OCH_3)_2$, $(CH_3CH_2)_2Si(OCH_3)_2$, $(CH_3)_2Si(OCH_2CH_3)_2$, $(CH_3CH_2)_2Si(OCH_2CH_3)_2$, $(CH_3CH_2)_3Si(OCH_2CH_3)$, $(CH_3)_3Si(OCH_3)$, $(CH_3CH_2)_3Si(OCH_3)$, and $(CH_3)_3Si(OCH_2CH_3)$.

The alkylalkoxysilane may be a single alkylalkoxysilane having the formula (I) or a mixture of two or more alkylalkoxysilanes, each having the formula (I). For example, a mixture of $CH_3Si(OCH_3)_3$ and $CH_3Si(OCH_2CH_3)_3$ may be used. Methods of preparing alkylalkoxysilanes are known in the art; many of these compounds are commercially available.

The first mixture comprising lithium hydroxide and water may be made by, for example, mixing solid lithium hydroxide or a lithium hydroxide hydrate ($LiOH.H_2O$) with water or by diluting a more concentrated lithium hydroxide-water mixture. Lithium hydroxide is well known in the art and is available commercially in various forms.

The addition of the alkylalkoxysilane to the first mixture comprising lithium hydroxide and water to produce the lithium alkylsiliconate and alcohol can be carried out in any reactor suitable for contacting an alkylalkoxysilane with an alkali metal hydroxide solution. Suitable reactors include glass and Teflon-lined glass reactors. Preferably the reactor is equipped with a means of agitation, such as stirring.

The alkylalkoxysilane is added to the first mixture comprising lithium hydroxide and water. Reverse addition of the first mixture comprising lithium hydroxide and water to the alkylalkoxysilane may produce large amounts of gels and lithium alkylsiliconate compositions that will form coatings with inferior water absorption properties.

The method of the invention involves an exothermic reaction, so the addition rate of alkylalkoxysilane to the first solution is controlled to prevent the creation of an uncontrollable exotherm. Otherwise, there is no limit on the rate of addition.

The alkylalkoxysilane is typically added to the lithium hydroxide at a temperature up to 80° C., alternatively from 20 to 80° C., alternatively from 25 to 80° C.; alternatively 50 to 80° C.

The time that the alkylalkoxysilane is added to the first mixture comprising lithium hydroxide and water to form the lithium alkylsiliconate and alcohol can vary depending on the structure of the alkylalkoxysilane and the temperature. For example, the alkylalkoxysilane is typically added to the lithium hydroxide for from 10 to 120 min, alternatively from 20 to 60 min, at a temperature of from 20 to 70° C. The optimum time can be determined by routine experimentation using the methods set forth in the Examples section below. The reaction of the alkylalkoxysilane is essentially complete after the alkylalkoxysilane has been added to the first mixture comprising lithium hydroxide and water. As used herein, "essentially complete" means that at least 90 mole %, alternatively at least 95 mole %, alternatively at least 98 mole %, of the alkoxy groups of the alkylalkoxysilane added to the first mixture have reacted.

The mole ratio of lithium hydroxide to alkylalkoxysilane varies with the mole % water as follows: i) the mole ratio of lithium hydroxide to alkylalkoxysilane is from 0.9 to less than 1.1 and the water is from 89 to 93 mol %, alternatively the mole ratio of lithium hydroxide to alkylalkoxysilane is from 0.95 to 1.08 and the water is from 90 to 93 mol %, or ii) the mole ratio of lithium hydroxide to alkylalkoxysilane is from at least 1.1 to 1.4 and the water is from greater than 93 to 99 mol %, alternatively the mole ratio of lithium hydroxide to alkylalkoxysilane is from 1.2 to 1.4 and the water is from greater than 94 to 97 mol %, alternatively the mole ratio of the lithium hydroxide to alkylalkoxysilane is from 1.2 to 1.4 and the water is from 95 to 97 mole %. As used herein, the "mol ratio of lithium hydroxide to alkylalkoxysilane" means the moles of lithium hydroxide in the first mixture divided by the moles of alkylalkoxysilane added. As used herein in reference to the water, "mole percent" or "mol %" is based on the moles of alkoxysilane, lithium hydroxide, and water added. The mol % water is calculated by dividing the initial moles of water in the first mixture by the sum of the moles of the alkylalkoxysilane added, the initial moles of lithium hydroxide, and initial moles of water, then multiplying the quotient by 100. The mole percents of alkylalkoxysilane and lithium hydroxide are similarly calculated and on the same basis.

The method may further comprise separating the alcohol from the lithium alkylsiliconate composition. The separation may be accomplished by, for example, distillation. For example, when the alcohol is methanol, the lithium alkylsiliconate composition may be heated to from 90 to 98° C., alternatively 90 to 95° C., to distill the methanol. Alternatively, the alcohol may be separated using vacuum distillation.

The mole ratio of lithium to silicon of the lithium alkylsiliconate composition prepared according to the present method varies according to the solids content. When the mol ratio of lithium to silicon is from 0.9 to less than 1.1, alternatively from 0.95 to 1.08, the solids content is from 15 to 25% (w/w); alternatively from 18 to 22% (w/w); or when the mol ratio of lithium to silicon is from 1.1 to 1.4, alternatively 1.2 to 1.4, the solids content is from 3 to less than 15% (w/w), alternatively from 5 to 12% (w/w). Solids content can be determined by placing a known amount of lithium alkylsiliconate composition into a suitable weighing dish and placing the weighing dish in an oven at a temperature from 40-60° C., for example 48° C., until a constant weight is achieved. The solids content can then be calculated by dividing the ending sample weight by the starting sample weight and multiplying by 100. The mole ratio of lithium to silicon of the lithium alkylsiliconate composition may be determined by common analytical techniques known in the art, such as by Inductively Coupled Plasma Optical Emission Spectrometry (ICP-OES) and Wavelength Dispersive X-ray Fluorescence (WDXRF).

The lithium alkylsiliconate composition produced by the method of the invention provides coatings with an 8-hour water absorption of less than 1.2 milliliters, alternatively 1.0 milliliter or less, alternatively from 0.1 to 1 milliliters. As used herein, the "8-hour water absorption" is the milliliters of water absorbed over 8 hours by a 3×5×⅜ inch (nominal) slab comprised of a medium aggregate concrete mix according to the test method described and exemplified below in the Examples section. Water absorption is the measure of the water repellency of a coating formed by a particular lithium alkylsiliconate composition. The less water absorbed in the test the greater the water repellency provided by a lithium alkylsiliconate composition.

The coating of the present invention can be prepared by applying the lithium alkylsiliconate composition to a substrate and drying the lithium alkylsiliconate composition to produce a coating. Typically, the lithium alkylsiliconate composition is prepared as described and exemplified above and then applied to at least a portion of the surface of a substrate. The lithium alkylsiliconate composition may be applied as prepared, diluted, or as part of a formulation with other common coating composition ingredients. The application to the substrate may be accomplished with a brush, roller, trowel, or spray equipment. The substrates typically comprise metal, ceramic, wood, stone, masonry, cementitious, and bituminous materials. For example, the lithium alkylsiliconate composition can be sprayed onto a horizontal cement surface and allowed to dry to produce the coating. The drying may be accomplished by any suitable means of drying a coating composition to form a coating. For example, the drying may be accomplished by allowing the lithium alkylsiliconate composition to air dry or by use of a mechanical device such as fan or blower. The lithium alkylsiliconate typically will polymerize and crosslink on drying to form the water repellent coating.

The coating composition of the invention comprises the lithium alkylsiliconate composition produced by the method described and exemplified above. The coating composition may also comprise other ingredients used in coating compositions. For example, the coating composition may also comprise alkali metal silicates, dyes, pigments, and colors. The coating composition may be prepared by methods know in the art. For example, the coating composition may be formed by diluting the lithium alkylsiliconate composition with water and adding any other common ingredients with mixing.

The lithium alkylsiliconate composition of the invention may be used to protect a substrate. The lithium alkylsiliconate composition used to protect a substrate is produced as described and exemplified above. The substrate is as described above; alternatively, the substrate has a horizontal surface, and the lithium alkylsiliconate composition is used to protect the horizontal surface, provided the substrate is not constructed from concrete, stone, or masonry or is not exposed flooring; alternatively the substrate has a vertical surface and the lithium alkylsiliconate composition is used to protect the vertical surface. The lithium alkylsiliconate composition may be used to protect a substrate by applying the lithium alkylsiliconate composition to the surface of the substrate to be protected and drying the lithium siliconate composition. For example, the lithium alkylsiliconate composition may be applied to the vertical surface of a substrate by, for example, spraying the lithium alkylsiliconate composition onto the surface. The lithium alkylsiliconate composition typically then dries to form a water repellent coating. As used herein, "protect" is intended to mean to prevent or slow the degradation of the substrate by weather, chemicals, or other corrosive elements. As used herein, "exposed flooring" is intended to mean flooring used inside of structures and exposed to the interior of the home, as opposed to flooring not exposed to the inside of the home such as underlayment.

Coatings produced from the lithium alkylsiliconate composition or the coating composition of the invention provide improved water repellency to, for example, silica-containing materials, such as cement, masonry, stone, and concrete, as evidenced by the results of the 8-hour water absorption testing described below. The increased water repellency results in improved protection of the silica-containing materials from degradation caused by weather, chemicals and other corrosive elements.

The method of invention can be used to produce various lithium alkylsiliconate compositions and coating compositions; the lithium alkylsiliconate and coating compositions have utility in producing water repellent coatings of silica-containing materials.

EXAMPLES

The following examples are presented to better illustrate the method of the present invention, but are not to be considered as limiting the invention, which is delineated in the appended claims. Unless otherwise noted, all parts and percentages reported in the examples are by weight. The following table describes the abbreviations used in the examples:

TABLE 1

List of abbreviations used in the examples.

| Abbreviation | Word |
| --- | --- |
| g | gram |
| Me | methyl |
| wt | weight |
| % | percent |
| mol | mole |
| hr | hour |
| NA | Not Applicable |
| mL | milliliters |
| cm | centimeter |

The following methods and materials were employed in examples 1-9:
Water Absorption Water absorption was measured using a test apparatus referred to as a water absorption tube, or RILEM (Reunion Internationale des Laboratoires D'Essais et de Recherches sur les Materiaux et les Constructions) tube, and the procedure used was based on RILEM method 11.4. The tube configuration was for measurement on horizontal surfaces. The tubes were graduated, with an overall dimension of 15 cm in height and an inner diameter of 0.5 cm. The water column in the RILEM tube itself being approximately 13 cm. The RILEM tubes were adhered to the substrate with plumber's putty.

The substrate used for the water absorption testing was a slab measuring 3×5×⅜ inch (nominal) comprised of a medium aggregate concrete mix. The mix ratio was 4.5 parts aggregate, 3 parts silica sand and 2 parts Portland Cement. The slabs were prepared by Masonry Test Block Inc. of Saginaw Mich. The slabs were conditioned to constant weight in a laboratory environment and had no loose or residual material on the surface.

Before testing, the slabs were treated with a particular test formulation. For comparison purposes, all lithium alkylsiliconate compositions were diluted to 3% (w/w) active ingredient (i.e., 3% lithium alkylsiliconate), with the balance being water, and were applied to the substrate at four grams per slab. The slabs were then allowed to dry and cure for at least 24 hours before performing the testing.

Eight (8)-hour water absorption for a particular test was determined by recording the water height difference in the RILEM tube after 8 hours.

Solids Content

The solids content was determined by drying a 2 g sample in a 48° C. vented oven until a constant weight was achieved. The solids content is the dry sample weight, divided by the initial sample weight, multiplied by 100.

Examples 1-9

Lithium Alkylsiliconate Synthesis Procedure

In a 3-neck, 2-liter flask equipped with a Barrett type moisture test receiver connected to a condenser, a heating mantle, a thermal couple, an addition funnel and a magnetic stirrer, LiOH.H2O (lithium hydroxide monohydrate) was dissolved in water to form a first mixture of lithium hydroxide and water. The first mixture of lithium hydroxide and water was heated to and maintained at 70° C. while MeSi(OMe)$_3$ was added into the flask through the additional funnel over about 1 hour to form a second mixture. As soon as the addition of MeSi(OMe)$_3$ was complete, the temperature of the second mixture was increased to 90-95° C. and methanol was removed (stripped) over 15 to 60 minutes. Finally, residual methanol was removed under vacuum in a rotary evaporator, such as a Brinkman/Büchi Rotary Evaporator, for 15 minutes.

The difference between the preparations of individual samples of examples 1-9 was in the amount of lithium hydroxide, water and methyltrimethoxysilane combined. This difference provided variation of the mol ratio of lithium hydroxide to alkylalkoxysilane, the initial mole percent of water, and in the solids content of the lithium methyl siliconate composition. Also, the water absorption reported for example 1 is the average of nineteen trials; examples 2 and 3 are the average of seven trials; example 4 is the average of four trials; comparative example 5 is the average of eight trials; comparative examples 6 and 7 are the average of two trials; comparative example 8 is the average of twenty trials; and example 9 is the average of nine trials. The moles of lithium hydroxide, alkylalkoxysilane, and water, along with other test parameters, for each example are listed in Table 2 below.

TABLE 2

Mole percents, Li:Si, solids content, and water absorption.

| Example | Mol % LiOH | Mol % MTM | Mol % water | Li:Si | Solids Content (%) | Water Absorption (mL) | Standard Deviation |
|---|---|---|---|---|---|---|---|
| 1 | 3.48 | 3.62 | 92.90 | 0.96 | 18.5 | 0.65 | 0.44 |
| 2 | 4.52 | 4.18 | 91.30 | 1.08 | 21.0 | 0.98 | 0.48 |
| 3 | 2.13 | 1.78 | 96.09 | 1.2 | 9.5 | 0.9 | 0.5 |
| 4 | 3.33 | 2.58 | 94.09 | 1.29 | 13.5 | 1.0 | 0.92 |
| 5 (Comparative) | 1.77 | 1.85 | 97.38 | 0.95 | 9 | 1.24 | 0.91 |
| 6 (Comparative) | 2.38 | 2.76 | 94.86 | 0.86 | 14.3 | 1.40 | 0.07 |
| 7 (Comparative) | 1.35 | 1.25 | 97.39 | 1.08 | 6.8 | 1.95 | 0.35 |
| 8 (Comparative) | 2.88 | 2.67 | 94.46 | 1.08 | 12.3 | 1.45 | 0.51 |
| 9 (Comparative) | 4.19 | 3.49 | 92.32 | 1.2 | 17.8 | 1.16 | 0.57 |

Thus, the examples with coatings formed from compositions made according to the invention provided superior water absorption compared to the comparative examples, where coatings were formed from compositions not made according to the invention.

That which is claimed is:

1. A method of making a lithium alkylsiliconate composition, the method comprising:
adding an alkylalkoxysilane to a first mixture comprising lithium hydroxide and water to form a second mixture comprising a lithium alkylsiliconate and an alcohol, wherein i) the mole ratio of lithium hydroxide to alkylalkoxysilane is from 0.9 to less than 1.1 and the water is from 89 to 93 mol %, or ii) the mole ratio of lithium hydroxide to alkylalkoxysilane is from 1.1 to 1.4 and the water is from greater than 93 to 99 mole %.

2. The method of claim 1, wherein the method further comprises separating the alcohol from the second mixture.

3. The method of claim 1, wherein the alkylalkoxysilane has the formula $$R_a Si(OR)_{4-a} \quad (I),$$

wherein each R is independently $C_1$-$C_{10}$ alkyl or cycloalkyl; and the subscript a is 1, 2 or 3.

4. The method of claim 1, wherein the alkylalkoxysilane is $CH_3Si(OCH_3)_3$.

5. The method of claim 1, wherein the mixture comprising lithium hydroxide and water is at a temperature from 25 to 80° C.

6. The method of claim 1, further comprising separating the alcohol from the lithium alkylsiliconate composition.

7. A method of making a coating, the method comprising:
making a lithium alkylsiliconate composition by a method comprising adding an alkylalkoxysilane to a first mixture comprising lithium hydroxide and water to form a second mixture comprising a lithium alkylsiliconate and an alcohol, wherein i) the mole ratio of lithium hydroxide to alkylalkoxysilane is from 0.9 to less than 1.1 and the water is from 89 to 93 mol %, or ii) the mole ratio of lithium hydroxide to alkylalkoxysilane is from 1.1 to 1.4 and the water is from greater than 93 to 99 mole %; and
applying the lithium alkylsiliconate composition to a substrate and drying the lithium alkylsiliconate composition to produce a coating.

8. The method of claim 7, wherein the substrate has a horizontal surface, and wherein the lithium alkylsiliconate composition is used to protect the horizontal surface, provided the substrate is not constructed from concrete, stone, or masonry or is not exposed flooring.

9. The method of claim 7, wherein the substrate has a vertical surface, and wherein the lithium alkylsiliconate composition is used to protect the vertical surface.

10. The method of claim 7, where the substrate is a silica-containing material.

11. The method of claim 7, further comprising adding a diluent and/or other coating composition ingredients to the lithium alkylsiliconate composition.

* * * * *